United States Patent
Nakar et al.

(10) Patent No.: US 12,250,244 B2
(45) Date of Patent: Mar. 11, 2025

(54) BATCH CLUSTERING OF ONLINE ATTACK NARRATIVES FOR BOTNET DETECTION

(71) Applicant: Imperva, Inc., Redwood Shores, CA (US)

(72) Inventors: Ori Nakar, Givat Shemuel (IL); Amit Leibovitz, Givat Shemuel (IL)

(73) Assignee: Imperva, Inc., San Mateo, CA (US)

( * ) Notice: Subject to any disclaimer, the term of this patent is extended or adjusted under 35 U.S.C. 154(b) by 65 days.

(21) Appl. No.: 17/139,661

(22) Filed: Dec. 31, 2020

(65) Prior Publication Data

US 2022/0210184 A1    Jun. 30, 2022

(51) Int. Cl.
- *H04L 9/40* (2022.01)
- *G06F 18/22* (2023.01)
- *G06F 18/23* (2023.01)

(52) U.S. Cl.
CPC .......... *H04L 63/1458* (2013.01); *G06F 18/22* (2023.01); *G06F 18/23* (2023.01); *H04L 63/0236* (2013.01); *H04L 63/14* (2013.01); *H04L 63/1466* (2013.01); *H04L 63/1475* (2013.01); *H04L 2463/144* (2013.01)

(58) Field of Classification Search
CPC . H04L 63/1458; H04L 63/0236; H04L 63/14; H04L 63/1466; H04L 63/1475; H04L 2463/144; G06K 9/6215; G06K 9/6218
See application file for complete search history.

(56) References Cited

U.S. PATENT DOCUMENTS

| | | | |
|---|---|---|---|
| 8,682,812 B1 * | 3/2014 | Ranjan | H04L 63/1425 706/12 |
| 8,745,731 B2 * | 6/2014 | Achan | H04L 63/1441 726/25 |
| 9,843,596 B1 * | 12/2017 | Averbuch | G06F 21/554 |
| 2015/0319185 A1 * | 11/2015 | Kirti | H04L 63/1416 726/23 |
| 2016/0173446 A1 * | 6/2016 | Nantel | H04L 63/1425 726/11 |
| 2016/0226904 A1 * | 8/2016 | Bartos | G06F 21/566 |
| 2018/0332064 A1 * | 11/2018 | Harris | H04L 43/08 |
| 2019/0372934 A1 * | 12/2019 | Yehudai | G06F 18/2321 |

* cited by examiner

*Primary Examiner* — Huan V Doan

(57) ABSTRACT

A method includes identifying, from online clustering data, an internet protocol (IP) pair. The method further includes determining, by a processing device during an offline process, that the IP pair is part of a botnet. The method further includes, in response to the determining, appending data associated with the botnet to the online clustering data.

17 Claims, 7 Drawing Sheets

BATCH CLUSTERING OF ONLINE ATTACK NARRATIVES FOR BOTNET DETECTION

TECHNICAL FIELD

Aspects of the present disclosure relate to botnet detection and more specifically, to batch clustering of online attach narratives for botnet detection.

BACKGROUND

Botnets are internet connected devices performing repetitive tasks. Botnets are used to perform different kinds of attacks on computer systems, such as Distributed Denial-of-Service (DDoS). In many cases, these devices are infected with a malicious malware, controlled by an external entity without the owner's knowledge.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
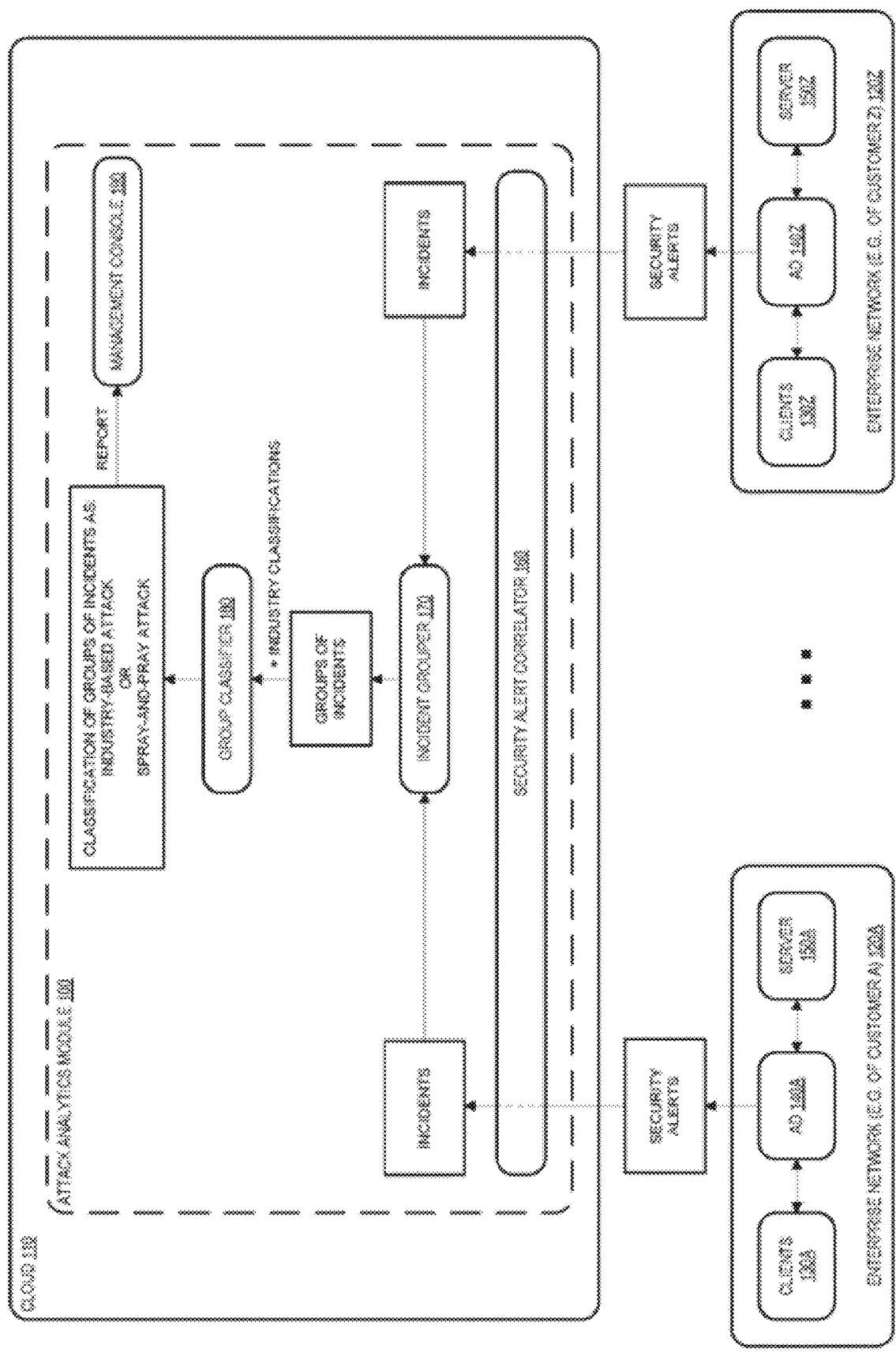
FIG. 1 is a block diagram illustrating a system for identifying and classifying community attacks, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

The cloud systems and methods described herein protect many hundreds of thousands of websites and block billions of security events every day. In one embodiment, Botnets are internet connected devices performing repetitive tasks. Botnets may be used to perform different kinds of cyber-attacks, such as DDoS (Distributed Denial-of-Service). In many cases, these devices may be infected with a malicious malware, controlled by an external entity without the owner's knowledge.

In one embodiment, a web application layer attack detector (e.g., a web application firewall) may sit in front of a web application server to protect the web application server from attacks by web application clients (e.g., Botnets). The web application layer attack detector may see the traffic being sent between the web application clients and the web application server, including web application layer requests (e.g., HTTP request messages) sent by the web application clients to the web application server, and can scan these requests for potential attacks.

A web application layer attack detector may generate a security alert whenever it suspects an attack or otherwise detects suspicious/anomalous behavior. The security alert may describe various features pertaining to the suspected attack. A web application layer attack detector for an enterprise (e.g., protecting a web application server hosted by the enterprise) may generate a large volume of security alerts, sometimes on the magnitude of thousands to millions per day. Analyzing such large volume of security alerts and extracting meaningful information from them can a difficult task, especially when such attacks originate from Botnets in a variety of less-detectable contexts.

Advantageously, in one embodiment, artificial intelligence and machine learning can be used to more quickly and efficiently analyze large volumes of security alerts. For example, an attack analyzer may use artificial intelligence and machine learning techniques to correlate multiple security alerts having similar features as being part of the same incident, or originating from the same Botnet. This helps drastically reduce the number of records/events that need to be investigated, which in turn allows enterprises to mitigate and respond to security threats more quickly and decisively. It also reduces the risk of missing attacks buried in a big heap of security alerts.

In one embodiment, attacks may largely be divided into two types: targeted attacks and community attacks. Targeted attacks are attacks targeting a particular victim (e.g., a web application hosted by a particular enterprise). These attacks usually involve a reconnaissance phase where the attacker studies the target victim's infrastructure to find vulnerabilities that it can exploit. In contrast, community attacks are attacks that target multiple potential victims with the hope of finding a vulnerable victim. Sometimes community attacks are used for reconnaissance purposes (e.g., to find vulnerable victims). The attacker may use the results of the reconnaissance to subsequently form a targeted attack. Targeted attacks are less common than community attacks but are generally considered to be the more serious form of attack.

The ability to identify community attacks is important for security personnel. It helps prioritize which attacks to further investigate, helps evaluate the true risk to web applications, and helps identify an attack that could be a precursor to a more serious targeted attack.

Advantageously, the botnet detection systems and methods described herein allow computer systems and security personal to enhance website security and get detailed information on botnet attacks. For example, when an attack is performed by a source internet protocol (IP) from a botnet, the customer and/or system may analyze general information about the botnet attacks, and decide to block the entire botnet.

Furthermore, the systems and methods described herein allow for more advanced detection methods than previously possible. For example, online clustering, may not be able to look back on a wide time range or multiple sites because of space complexity and time constraints. The events are clustered as they come and its main advantage is that the results can be shown on the fly. By contrast, batch detection can be based on large data sets (e.g., "all sites") and a long time frame (e.g., days, weeks and even more). Here, it can detect long term attacks, on multiple websites.

Examples of attacks detectable according the embodiments described herein include, but are not limited to: IPs attacking multiple sites—it might be harder and sometimes impossible to detect a cluster of IPs in the scope of a single site because of a small data (when looking on all sites the full group can be detected); Low and slow attacks—online clustering might miss low and slow attacks and break them to pieces, mainly because of the small time range; and Periodic attacks—online clustering will be completely blind to periodic attacks, for example an attack that only happens on weekends, because it does not have the time dimension as an indicator.

FIG. 1 is a block diagram illustrating a system for identifying and classifying community attacks, according to some embodiments. As shown in the diagram, the system includes a cloud 110 and enterprise networks 120 A-Z communicatively coupled to the cloud 110. Each enterprise network 120 includes a web application layer attack detector 140 (AD) communicatively coupled between clients 130A and a server 150. For example, enterprise network 120A includes web application layer attack detector 140A that is communicatively coupled between clients 130A and server 150A, while enterprise network 120Z includes web application layer attack detector 140Z that is communicatively coupled between clients 130Z and server 150Z. In one embodiment, each of the servers 150 is a web application server and each of the clients 130 is an HTTP client. While the diagram shows the clients 130 being located within an enterprise network 120, some clients 130 may be located outside of the enterprise network 120 and these clients 130 may access (or attempt to access) a server (e.g., server 150A or server 150Z) from outside an enterprise network 120.

In one embodiment, web application layer attack detector 140A is configured to protect server 150A against web application layer attacks from clients 130A (e.g., Structured Query Language injection (SQLi) attacks, Cross-Site Request Forgery (CSRF) attacks, and Remote File Inclusion (RFI) Attacks). Web application layer attack detector 140A can be implemented by one or more electronic devices. Web application layer attack detector 140A may sit inline to the traffic being sent between clients 130A and server 150A such that it can see the traffic being sent between clients 130A and server 150A. In one embodiment, web application layer attack detector 140A is a web application firewall and may be implemented as a reverse proxy that receives connection requests (e.g., Transmission Control Protocol (TCP) connection requests) from clients 130A on behalf of server 150A. Web application layer attack detector 140A may complete the connections with clients 130A (e.g., complete the TCP three-way handshake) and receive data streams carrying web application layer requests intended for server 150A over those connections. Web application layer attack detector 140A may also establish connections with the server 150A to send the received web application layer requests to server 150A.

In one embodiment, web application layer attack detector 140A may generate security alerts based on applying a set of security rules to traffic (e.g., web application layer messages) being sent between clients 130A and server 150A. A security alert may include a variety of types of information related to the packets or web application layer messages that triggered the alert (e.g., by meeting the conditions specified by one or more security rules), including but not limited to part or all of the web application layer messages themselves, "packet parts" that include information from packet headers of the packet(s) carrying the web application layer messages that meet the rule condition (e.g., source or destination IP addresses from an IP header, source or destination ports from a TCP header or UDP header, a Media Access Control (MAC) address or Virtual LAN (VLAN) identifier value from an Ethernet header, etc.), an identifier of the matched security rule having the condition met, part or all of the condition of the matched security rule, an attack type of the matched security rule, a category of the matched security rule, a set of violation indicators describing other flaws or departures from a proper protocol found in the packets, and/or a timestamp generated by the web application layer attack detector 140 indicating when the web application layer attack detector 140 received or processed the packet(s).

While the diagram shows web application layer attack detector 140A and server 150A being deployed in enterprise network 120A (on-premise), in some embodiments, web application layer attack detector 140A and/or server 150A may be deployed in the cloud 110 (e.g., a cloud provided by a cloud provider such as Amazon, Microsoft, etc.). In one example of an arrangement, web application layer attack detector 140A is deployed in the cloud 110 while server 150A is deployed on-premise, and any web application layer requests generated by clients 130A that are intended for server 150A are first directed to web application layer attack detector 140A in the cloud 110 (e.g., by changing Domain Name Service (DNS) records) before being sent to the on-premise server 150A. It should be understood that other arrangements are also possible (e.g., both web application layer attack detector 140A and server 150A may be deployed in the cloud 110).

While the diagram shows server 150A being protected by a single web application layer attack detector 140A, in some embodiments, server 150A may be protected using multiple web application layer attack detectors 140A (e.g., that are geographically dispersed). Attack detectors 140B-Z may perform similar operations as attack detector 140A but with respect to traffic being sent between their respective clients 130 and servers 150 (e.g., web application layer attack detector 140Z may generate security alerts based on applying a set of security rules to traffic being sent between clients 130Z and server 150Z), and thus are not further described to avoid repetition.

A web application layer attack detector 140 may be implemented as a separate component (e.g., the web application layer attack detector 140 may reside on a separate physical machine (sometimes referred to as a gateway) or a separate virtual machine (sometimes referred to as a remote agent or a remote sensor)) from the web application server 150 or fully or partially integrated as an in-process agent within the web application server 150 (i.e., the web application layer attack detector 140 is implemented as a loadable kernel component that is configured to see and analyze traffic being sent to and from a corresponding web application server 150). Also, as mentioned above, a web application layer attack detector 140 may be deployed in a cloud 110 (e.g., a cloud provided by a cloud provider such as Amazon, Microsoft, etc.) or on premise. For example, in-process agent web application layer attack detectors 140 may be deployed with the web application servers 150 in a cloud 110 (e.g., a private cloud, a cloud provided by a cloud provider such as Amazon) or in multiple clouds.

As shown in the diagram, the cloud 110 includes an attack analytics module 100 that is configured to analyze security alerts generated by web application layer attack detectors 140. The attack analytics module 100 can be implemented by one or more electronic devices (e.g., in the cloud 110). The services of the attack analytics module 100 may be provided by a company that provides cybersecurity products and/or data security services to customers. For example, the owner/operator of enterprise network 120A and the owner/operator of enterprise network 120Z may be customers (customer A and customer B, respectively) of the company that provides the services of the attack analytics module 100.

As shown in the diagram, the attack analytics module 100 includes a security alert correlator 160, an incident grouper 170, a group classifier 180, and a management console 190. The security alert correlator 160 may receive security alerts generated by an attack detector 140 and correlate/distill those security alerts into incidents, where each incident represents a group of security alerts that have been determined to be associated with the same security event (e.g., an attack or potential attack) based on having similar features. Each incident may be described using various features. In one embodiment, these features include the origin of the incident, the tool that was used to cause the incident, the type of attack involved in the incident, the target of the incident, and the timing of the incident, or any combination thereof. The origin of the incident may indicate the network source (e.g., source IP address and the class of the IP address (e.g., class B or class C), etc.) and/or the geographic source (e.g., subdivision, province, country, content distribution network (CDN) edge, etc.). In one embodiment, the origin of the incident is indicated using a histogram or distribution of origins. The tool that was used to cause the incident may indicate the client application that was used and/or the tool type. In one embodiment, the tool that was used to cause the incident is indicated using a histogram or distribution of client applications that were used. The target of the incident may indicate the host name of the target, the uniform resource locator (URL) of the target, the HTTP method (e.g., GET or POST), and/or parameters passed in the HTTP request. The type of attack involved in the incident may indicate the attack type (e.g., SQL injection, cross-site scripting (XSS) attack, an unauthorized resource access, bad bots, etc.) and/or the security rules that were triggered/violated. The timing of the incident may indicate the time when the incident occurred, the duration of the incident, and/or any time patterns of the incident (e.g., periodic properties of the incident).

The security alert correlator 160 may correlate/distill security alerts generated by multiple different web application layer attack detectors 140 into incidents. For example, the security alert correlator 160 may correlate/distill security alerts generated by web application layer attack detector 140A into incidents and also correlate/distill security alerts generated by web application layer attack detector 140B into incidents. In one embodiment, the security alert correlator 160 uses machine learning systems to correlate/distill security alerts into incidents. As used herein, incidents representing a group of security alerts generated by a web application layer attack detector 140 protecting a server 150 within an enterprise network 120 may be referred to as an incident occurring in that enterprise network 120.

The security alert correlator 160 may provide incidents occurring in multiple different enterprise networks to the incident grouper 170. For example, the security alert correlator 160 may provide incidents occurring in enterprise network 120A (e.g., which were generated based on grouping security alerts generated by attack detector 140A) and incidents occurring in enterprise network 120Z (e.g., which were generated based on grouping security alerts generated by attack detector 140Z) to the incident grouper 170. The incident grouper 170 may thus receive incidents occurring across multiple enterprise networks 120 (e.g., belonging to multiple customers).

The incident grouper 170 may group similar incidents (e.g., incidents having similar features) occurring across multiple enterprise networks 120 into one or more groups of incidents. Incidents may be grouped based on one or more features. For example, incidents having the same source IP address can be grouped together. As another example, incidents that occur during similar times, from the same client application, from the same country, and targeting the same URL may be grouped together. As another example, incidents that occur during similar times, from the same client application, having the same attack type, and from the same province may be grouped together. In one embodiment, as will be described in further detail below, the incident grouper 170 uses a clustering-based grouping algorithm to group incidents into groups. In another embodiment, as will be described in further detail below, the incident grouper 170 uses a rule-based grouping algorithm to group incidents into groups.

Once the incident grouper 170 groups the incidents into one or more groups of incidents, the incident grouper 170 may provide these groups to the group classifier 180. The incident grouper 170 may also provide industry classifications for each of the groups of incidents. The industry classification for a group of incidents indicates the industry/sector (e.g., banking, health, gaming, social media, etc.) that the group of incidents targeted. Each incident within a group of incidents may be assigned an industry classification based on which enterprise network 120 the incident occurred in and/or which application the incident targeted. For example, if the incident occurred in the enterprise network 120 of a bank or targeted a web application of the bank, then the industry classification of that incident may be determined as "banking." In one embodiment, the industry classification for a group of incidents is determined based on which industry is most prevalent among the incidents in that group. In one embodiment, the industry classification for a group is provided as a histogram/distribution of industry classifications of the incidents within that group.

The group classifier 180 may classify one or more of the groups of incidents it receives from the incident grouper 170 as being a community attack. As used herein, a community attack is an attack that targets more than one enterprise network 120 or web application. In one embodiment, the group classifier 180 may further classify groups of incidents classified as being a community attack as being an industry-based attack or a spray-and-pray attack. As used herein, an industry-based attack is an attack that targets a single industry, whereas a spray-and-pray attack is an attack that targets multiple industries. The group classifier 180 may classify a group of incidents based on the number of customers involved, the type of attack, and/or a histogram/distribution of industries. For example, a group of incidents that includes incidents occurring across a large number of different enterprise networks of different customers may indicate that the group is more likely to be a community attack (i.e., industry-based attack or spray-and-pray attack). As another example, a group of incidents that includes incidents involving a "bad bot" attack type may indicate that the group is more likely to be a community attack. As yet another example, if most of the incidents within a group of incidents are associated with a single industry, then this may indicate that the group is more likely to be an industry-based attack as opposed to a spray-and-pray attack. A high score in all three indicators mentioned above may indicate that the group is likely to be an industry-based attack. If only the first two indicators have high scores (large number of customers targeted and bad bot type of attack), then this may indicate that the group is likely a spray-and-pray attack. In one embodiment, the group classifier 180 classifies one or more groups of incidents as being a targeted attack. For example, the group classifier 180 may classify a group of incidents as being a targeted attack if the group of incidents was not classified as being a community attack (e.g., not an industry-based attack or spray-and-pray attack). In one embodiment, the group classifier 180 also determines a confidence value for each group of incidents that represents a confidence level that incidents in that group of incidents are indeed associated with the same attack or potential attack.

In one embodiment, the attack analytics module 100 generates and causes a report to be displayed by a management console 190 that indicates the results of the classification to a customer (e.g., customer A and/or customer Z) or other security personnel. In one embodiment, the report indicates whether an incident occurring in an enterprise network 120 is part of a group of incidents classified as being a community attack (and may further indicate whether this attack is classified as being an industry-based attack or spray-and-pray attack). The report may also indicate the features that are common among incidents within a group of incidents occurring across multiple enterprise networks. For example, the report may indicate that all incidents within a group of incidents have a particular source IP address. Customers may use this information to deploy security measures in their enterprise network 120 such as blocking traffic having that specific source IP address.

Also, a customer may use the results of the classifications to help identify false positive incidents. False positive incidents are incidents that do not represent actual attacks—it can be caused, for example, by bugs in the application code. It can be assumed that if an incident is part of a group of incidents classified as being a community attack (e.g., industry-based attack or spray-and-pray attack), then it has a low probability of being a false positive. Thus, if an incident is part of a group of incidents that was classified as being a community attack, then it is more likely to be a true positive (and not a false positive), and the customer can take appropriate security measures. The customer may further use this information to identify misconfigurations. A misconfiguration may exist when a security alert is generated but traffic that caused the security alert to be generated is not blocked. Thus, in cases where a security alert is generated for an incident that is part of a community attack (and thus the incident is likely a true positive), but the traffic is not blocked, then it is likely that there is a misconfiguration, and the customer can take appropriate measures to correct the misconfiguration.

Figure 2:
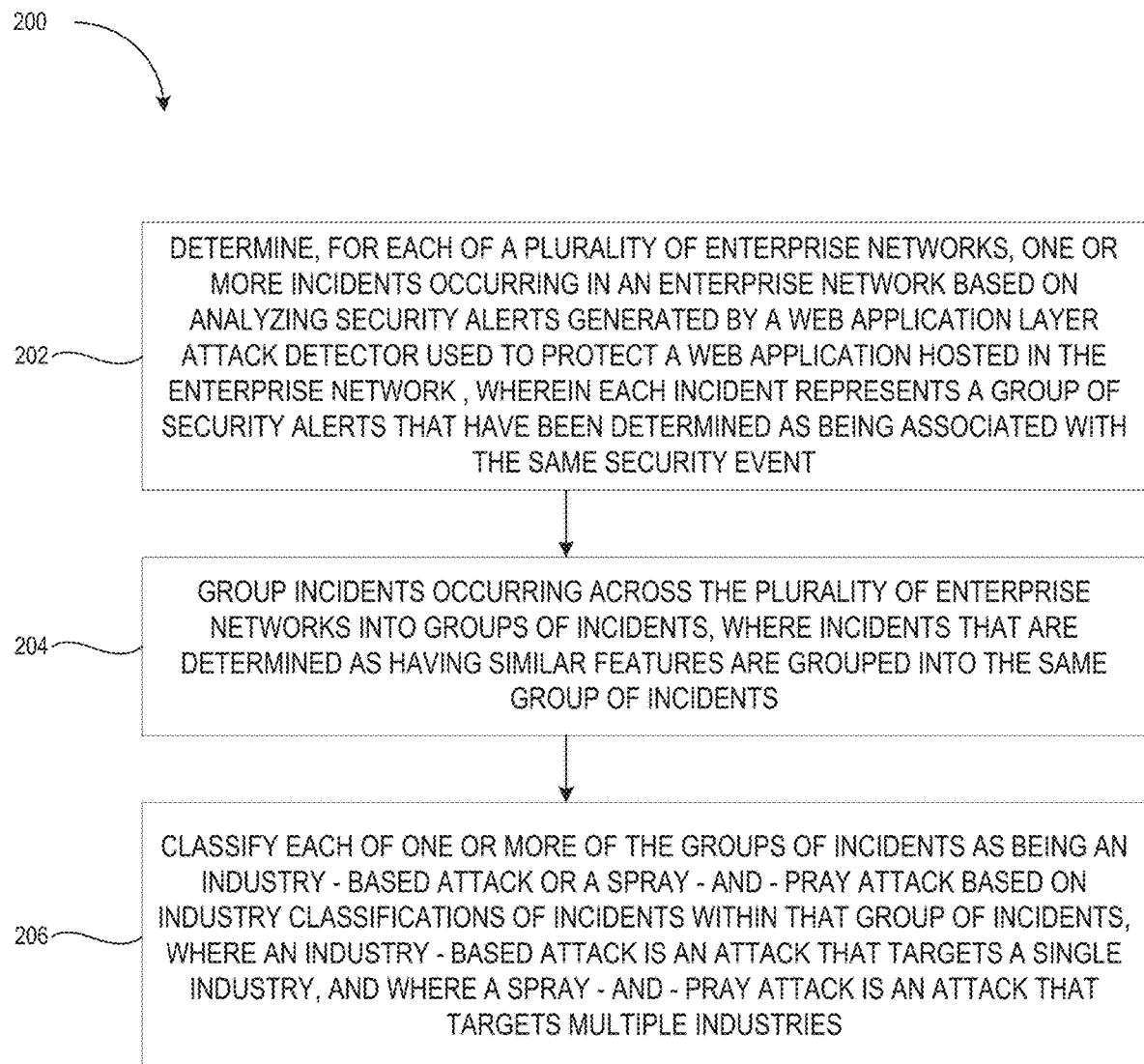
FIG. 2 is a flow diagram of a process for identifying and classifying community attacks, according to some embodiments.

FIG. 2 is a flow diagram of a process for identifying and classifying community attacks, according to some embodiments. In one embodiment, the process is implemented by one or more electronic devices implementing an attack analytics module 100. The operations in this and other flow diagrams have been described with reference to the example embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams. Similarly, while the flow diagrams in the figures show a particular order of operations performed by certain embodiments, it should be understood that such order is one example (e.g., alternative embodiments may perform the operations in a different order, combine certain operations, overlap certain operations, etc.).

At block 210, the attack analytics module determines, for each of a plurality of enterprise networks, one or more incidents occurring in that enterprise network based on analyzing security alerts generated by a web application layer attack detector used to protect a web application hosted in that enterprise network, where each incident represents a group of security alerts that have been determined as being associated with the same security event.

At block 220, the attack analytics module groups incidents occurring across the plurality of enterprise networks into groups of incidents, where incidents that are determined as having similar features are grouped into the same group of incidents. As will be described in additional detail below, the attack analytics module may group incidents into groups (e.g., "narratives") of incidents (e.g., "security events") using a clustering-based grouping algorithm or a rule-based grouping algorithm.

At block 230, the attack analytics module classifies each of one or more of the groups of incidents as being an industry-based attack or a spray-and-pray attack based on industry classifications of incidents within that group of incidents, where an industry-based attack is an attack that targets a single industry, and wherein a spray-and-pray attack is an attack that targets multiple industries.

Figure 3:
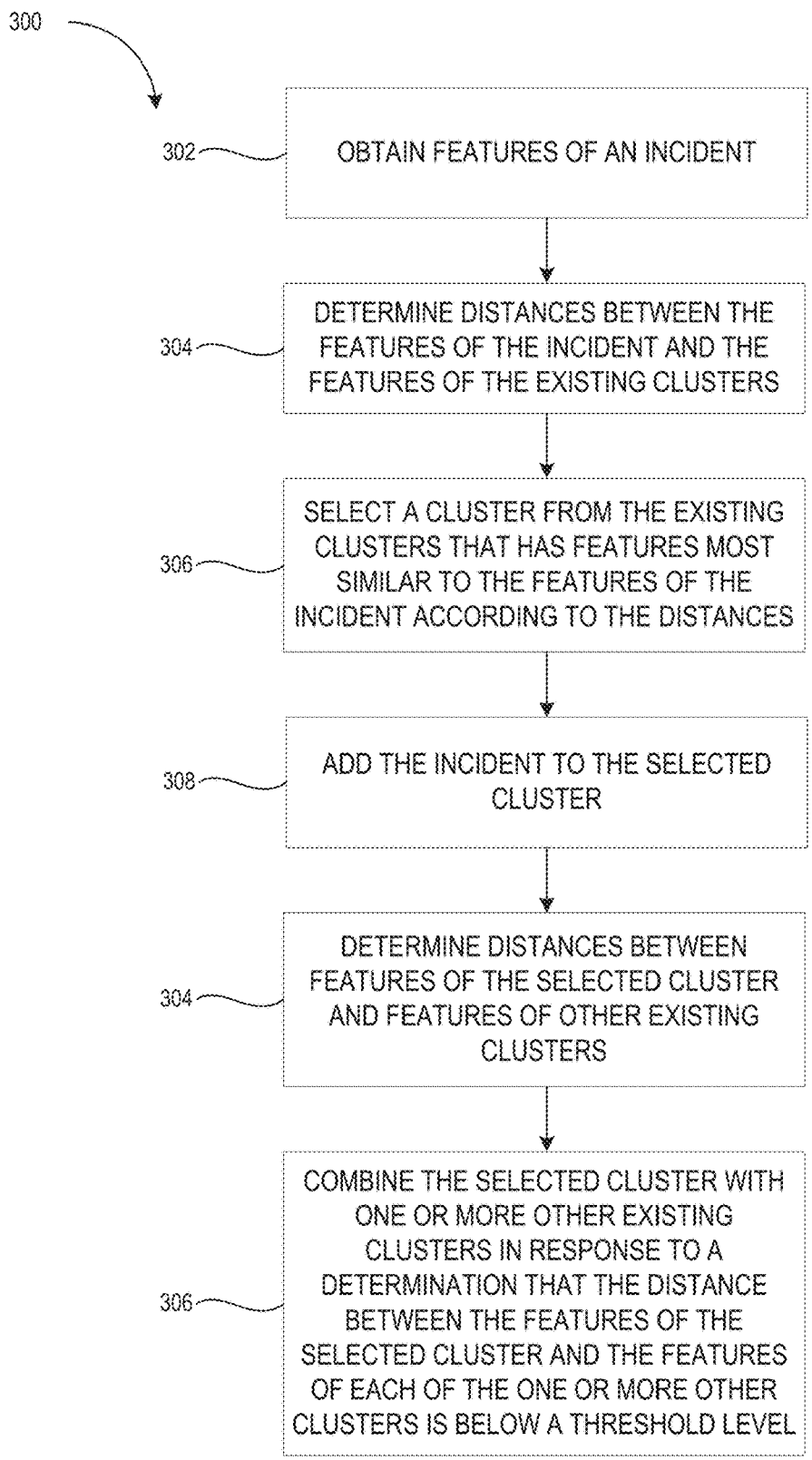
FIG. 3 is a flow diagram of a process for grouping incidents using a clustering-based grouping algorithm, according to some embodiments.

FIG. 3 is a flow diagram of a process for grouping incidents using a clustering-based grouping algorithm, according to some embodiments. In one embodiment, the process is implemented by an attack analytics module 100, and more specifically the incident grouper 170 of the attack analytics module 100.

At block 310, the incident grouper obtains features of an incident and at block 320, the incident grouper determines distances between the features of the incident and features of existing clusters. The distance between features indicates a measure of similarity between those features. In one embodiment, the incident grouper determines the distance between features based on applying a distance function to those features. In one embodiment, the incident grouper cleans and/or transforms the data describing the features before applying the distance function. For example, a URL may be separated into its basic components (e.g., host name, path, resource, and file type), patterns can be extracted from a URL, different subnets/classes are identified from the IP address (e.g., class B or class C), and/or geo-location is determined based on the IP address. The distance function may measure distance using various techniques. For example, for numeric values, the distance may be measured using Euclidian distance. For text, the distance may be measured using a discrete distance ('1' if equal and '0' if not equal) or Levenshtein distance (minimum number of character edits needed to change one text to another text). For IP addresses, the distance may be measured using geo-location distance. In one embodiment, the distance between IP addresses is measured as a weighted difference between each octet. For example, the distance (d) between IP addresses x4.x3.x3.x1 (IP1) and y4.y3.y2.y1 (IP2) may be defined as follows:
IP as 4-dimensional data (for IPv4):
IP1=x4.x3.x2.x1
IP2=y4.y3.y2.y1
Distance between IP1 and IP2:

$$d(IP1,IP2)=(x1-y1)2+10\cdot(x2-y2)2+100\cdot(x3-y3)2+1000\cdot(x4-y4)2$$

In one embodiment, the distance between IP addresses is measured based on the size of the mutual prefix between the IP addresses in 32-bit representation. For example, the distance (d) between IP addresses may be defined as follows:
IP as 32-dimensional data (for IPv4):
IP1=11001011100001000011111101110101
IP2=11001100101010101010110100101011

$$d(IP1,IP2)=1-(\text{size of mutual prefix})\cdot\tfrac{1}{32}$$

In one embodiment, the distance between histogram/distribution values (e.g., histogram/distribution of URLs, IP addresses, hots, timing, etc.) is measured using a cosine function or entropy. In general, the distance between sets of features may be measured as a weighted sum of the distances between each of the features. For example, the distance between two attacks (e.g., incidents and/or clusters) may be defined as follows:
Total distance between incidents/attacks $$\text{Distance}(Incident\_1, Incident\_2)=w1\cdot\text{distance}(IP1, IP2)+w2.$$

$$\text{distance}(URL1,URL2)+\ldots+wd\cdot\text{distance}(User\text{-}Agent1, User\text{-}Agent2)$$

d=number of features

At block 330, the incident grouper selects a cluster from the existing clusters that has features most similar to the features of the incident according to the distances (e.g., the cluster having the minimum distance). At block 340, the incident grouper adds the incident to the selected cluster. At block 350, the incident grouper determines distances between features of the selected cluster (which now includes the newly added incident) and features of other existing clusters (e.g., using a distance function). At block 360, the incident grouper combines the selected cluster with one or more other existing clusters in response to a determination that the distance between the features of the selected cluster and the features of each of the one or more other clusters is below a threshold level. In one embodiment, the incident grouper may remove an incident from an existing cluster (e.g., because the incident is older than a threshold age). In one embodiment, the incident grouper may combine clusters following removal of an incident from an existing cluster.

Figure 4:
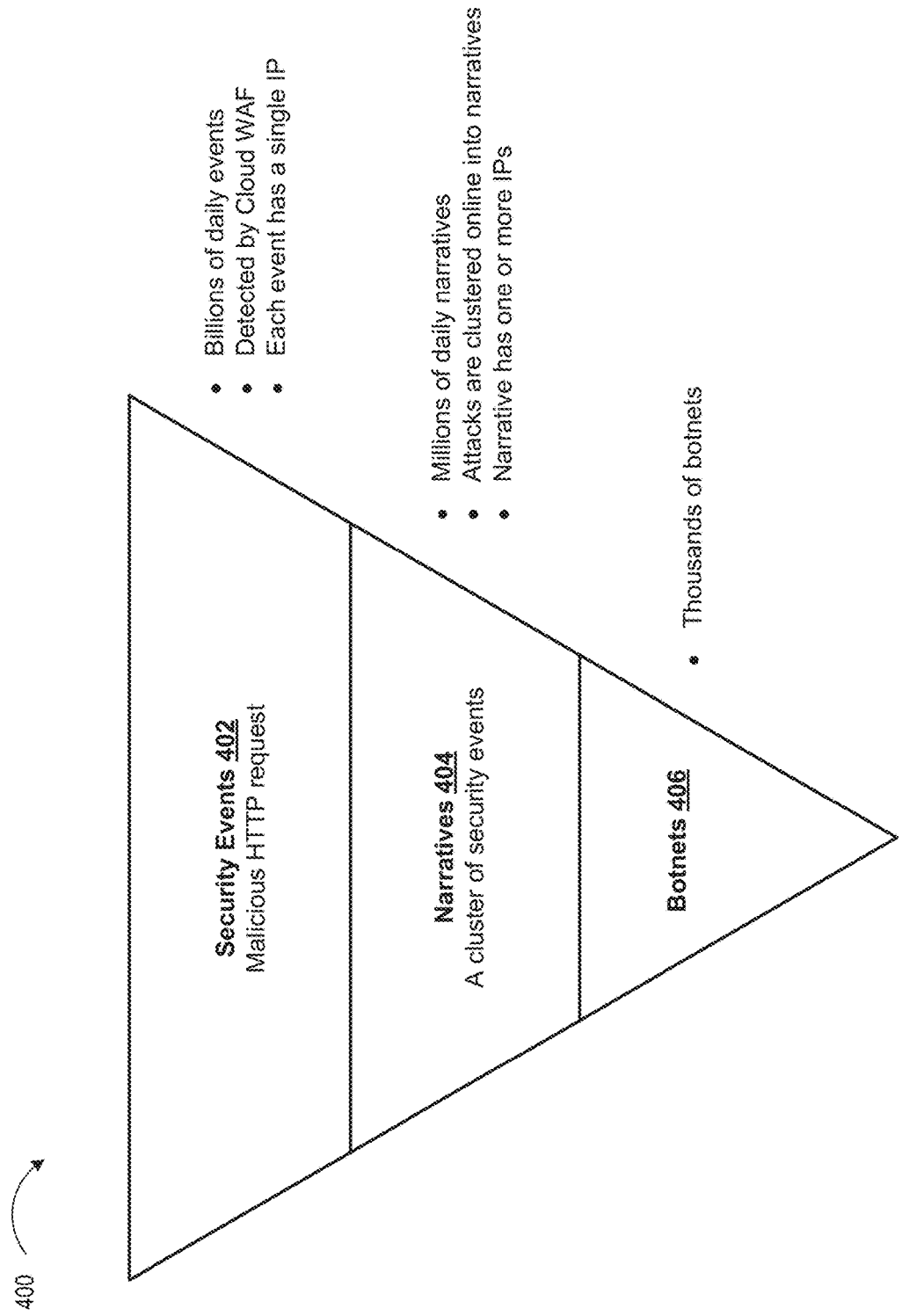
FIG. 4 is a first flow diagram of a botnets detection method, according to some embodiments.

FIG. 4 is a first flow diagram of a botnets detection method, according to some embodiments. The method 400 may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic corresponding to one or more components of any of the figures or description herein may perform one or more of the following operations.

Referring to FIG. 4, processing logic may identify security events 402 and narratives 404 according to the systems and methods described above. In one embodiment, the security events 402 may correspond to one or more malicious HTTP requests. Security events 402 may occur billions of times daily, and be detected according to the systems and methods described herein. In one embodiment, each security event originates from a single source IP. In another embodiment, a security event may be defined such that it comprises multiple associated source IPs.

In one embodiment, narratives 404 may be a cluster of security events. Multiple Security events 402 or attacks may be clustered in an online (e.g., real-time) process into one or more narratives 404. Such narratives 404 may occur millions of times daily and correspond to one or more source IPs.

In one embodiment, botnets 406 can be detected and validated from narrative data using machine learning clustering techniques. Advantageously, this method can be generalized to any online clustering to batch clustering for other types of data. Additional details with respect to botnet detection are described herein.

Figure 5:
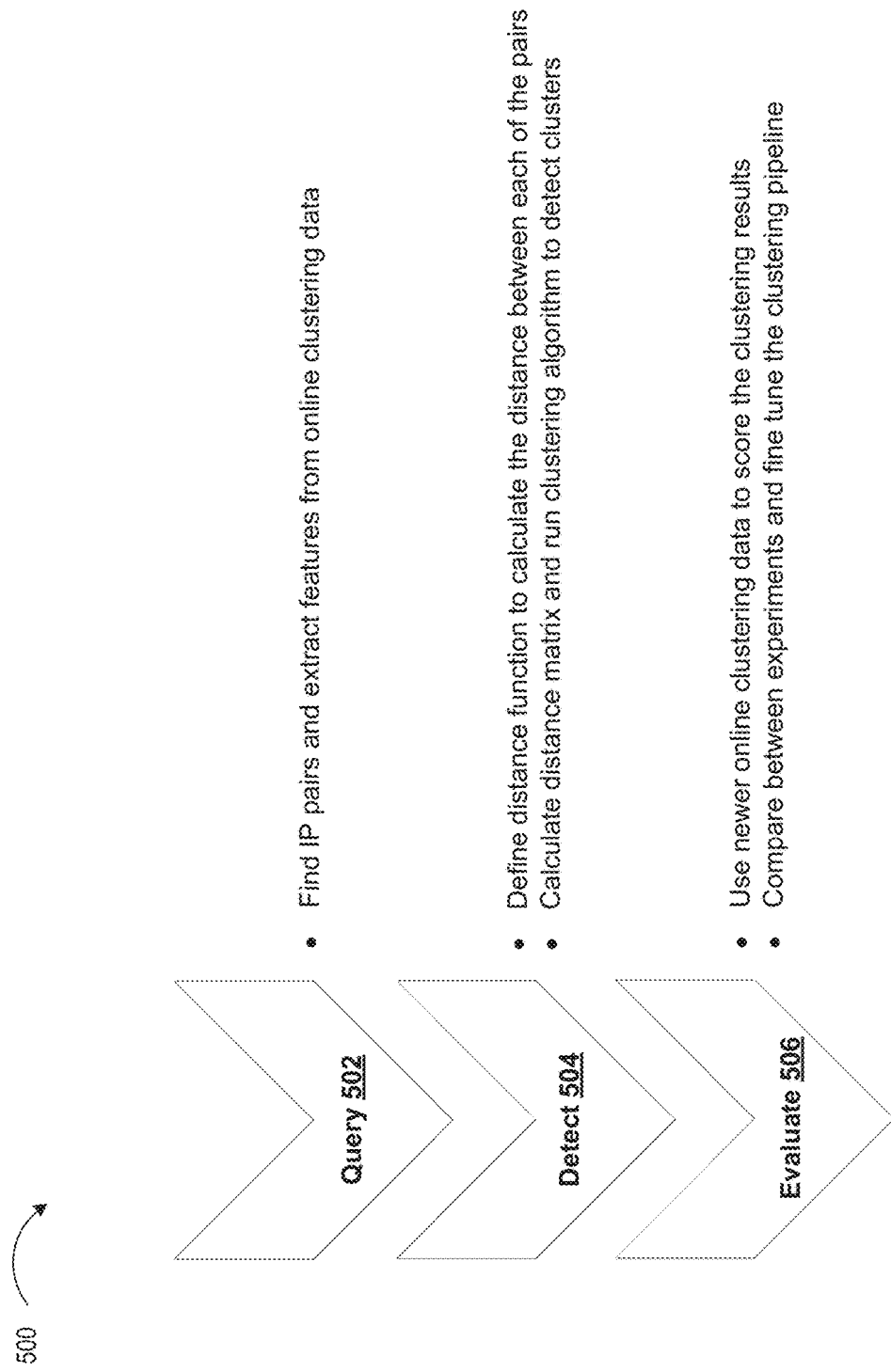
FIG. 5 is a flow diagram of an online to batch clustering method, according to some embodiments.

FIG. 5 is a flow diagram of an online to batch clustering method, according to some embodiments. The method 500 may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic corresponding to one or more components of any of the figures or description herein may perform one or more of the following operations.

Referring to FIG. 5, at block 502, processing logic performs a query stage 502, in which processing logic may find IP pairs and extract features (e.g., including, but not limited to, those described in Table 1, below). In one embodiment, IP pairs may include random pairs of source IPs. In another embodiment, IPs may be paired based on a spatial or temporal proximity method or any other suitable algorithm.

TABLE 1

| Feature family | Features |
|---|---|
| IP properties | Subnet |
| | Region |
| | Country |
| | ASN |
| | IP reputation - Daily reputation score between 0-1 for all attacking IPs |
| Correlation properties | Longest IP prefix |
| | # common attacks |
| |    number of narratives the pair participated in |
| | # common sites |
| |    Number of different sites/accounts the pair participated in |
| | Time - hour/minute of attack |
| Narratives properties | Attack tool histogram (clapp, user-agent) |
| | Attack type histogram (type, rule id) |
| | Attack target (url pattern, file extension, method) |
| History | Whether an IP pair was in a botnet in the last batch clustering results - helps detecting long term attacks |

At block 504, processing logic performs a detection stage 504. In detection stage 504, processing logic may define a distance function to calculate the distance between each of the pairs identified at 502. In one embodiment, after the distance function is defined, processing logic may calculate a distance matrix and run clustering algorithms to detect clusters. The detection stage features are further described herein, with respect to FIG. 3, for example.

At block 506, processing logic may perform an evaluation stage 506. In the evaluation stage 506, processing logic may use the new clustering data calculated at 504 to update existing online clustering data and compare experiments to fine-tune the clustering pipeline.

Figure 6:
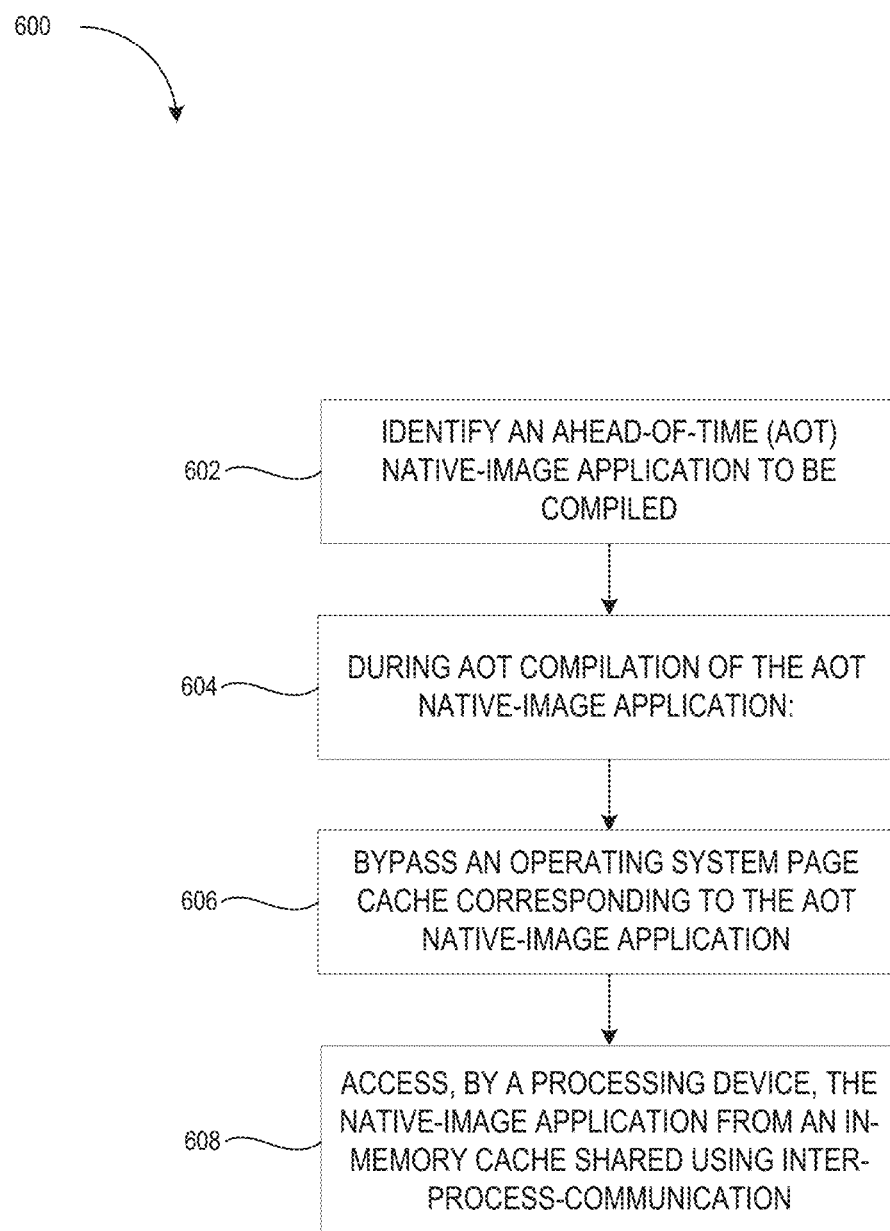
FIG. 6 is a second flow diagram of a botnets detection method, according to some embodiments.

FIG. 6 is a second flow diagram of a botnets detection method. The method 600 may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic corresponding to one or more components of any of the figures or description herein may perform one or more of the following operations.

Referring to FIG. 6, at block 602, processing logic identifies, from online clustering data, an internet protocol (IP) pair. In one embodiment, the IP pair includes two source IPs, and the processing logic is further to determine a distance metric (e.g., a distance-related feature) corresponding to a feature of the two source IPs and determine that the IP pair is part of the botnet when the distance metric is less than a predefined threshold. In one embodiment the distance metric is geolocation based. In another embodiment, it may be temporally based. In one embodiment, processing logic may extract the feature from the online clustering data and define a distance function corresponding to the distance metric, as described herein. In one embodiment, the distance function is to calculate a distance between the feature(s) of the two source IPs, respectively. In one embodiment, the feature may include at least one of: an IP property, a correlation property, a narrative property, or a history property (e.g., see Table 1).

In one embodiment the online clustering data is clustering data that was collecting during an online (e.g., real-time, live, etc.) process, as described herein. At block 604, processing logic may determine, by a processing device during an offline process (e.g., as opposed to an online process, as described herein), that the IP pair is part of a botnet. techniques for determining the botnet are described herein, but are not limited to such. Other suitable botnet-detection techniques are contemplated.

At block 606, in response to the determining, processing logic may append data associated with the botnet to the online clustering data. In this way, offline data determined during the offline botnet batch detection stages may enrich online data determined during the online clustering stages, at which point the feedback cycling may repeat any number of times. Advantageously, this allows for real-time analysis to be supplemented with offline results, and thus provide the benefits of both techniques in tandem. In one embodiment, in response to the determining, processing may optionally take one or more actions to prevent the botnet from performing future attacks on the system. For example, in one embodiment, processing logic may block one or more IP addresses associated with the botnet in response to the determination.

In a variety of embodiments, the botnet detection may occur a variety of contexts previously not possible. For example, in one embodiment, processing logic may determine that the botnet is associated with a multi-site attack (e.g., an attack to multiple websites, servers, services, applications, etc. In another embodiment, processing logic may determine that the botnet is associated with an attack occurring over a duration that exceeds a predefined threshold (e.g., over a week, month, year, etc.). In yet another embodiment, processing logic may determine that the botnet is associated with an attack occurring over a regular period (e.g., every day at a specific time, only on certain days of the week/month/year, etc.). Advantageously, the embodiments described herein may also increase the performance and efficiency of computer systems implementing the embodiments, as such embodiments require less compute power and resources in real-time.

Figure 7:
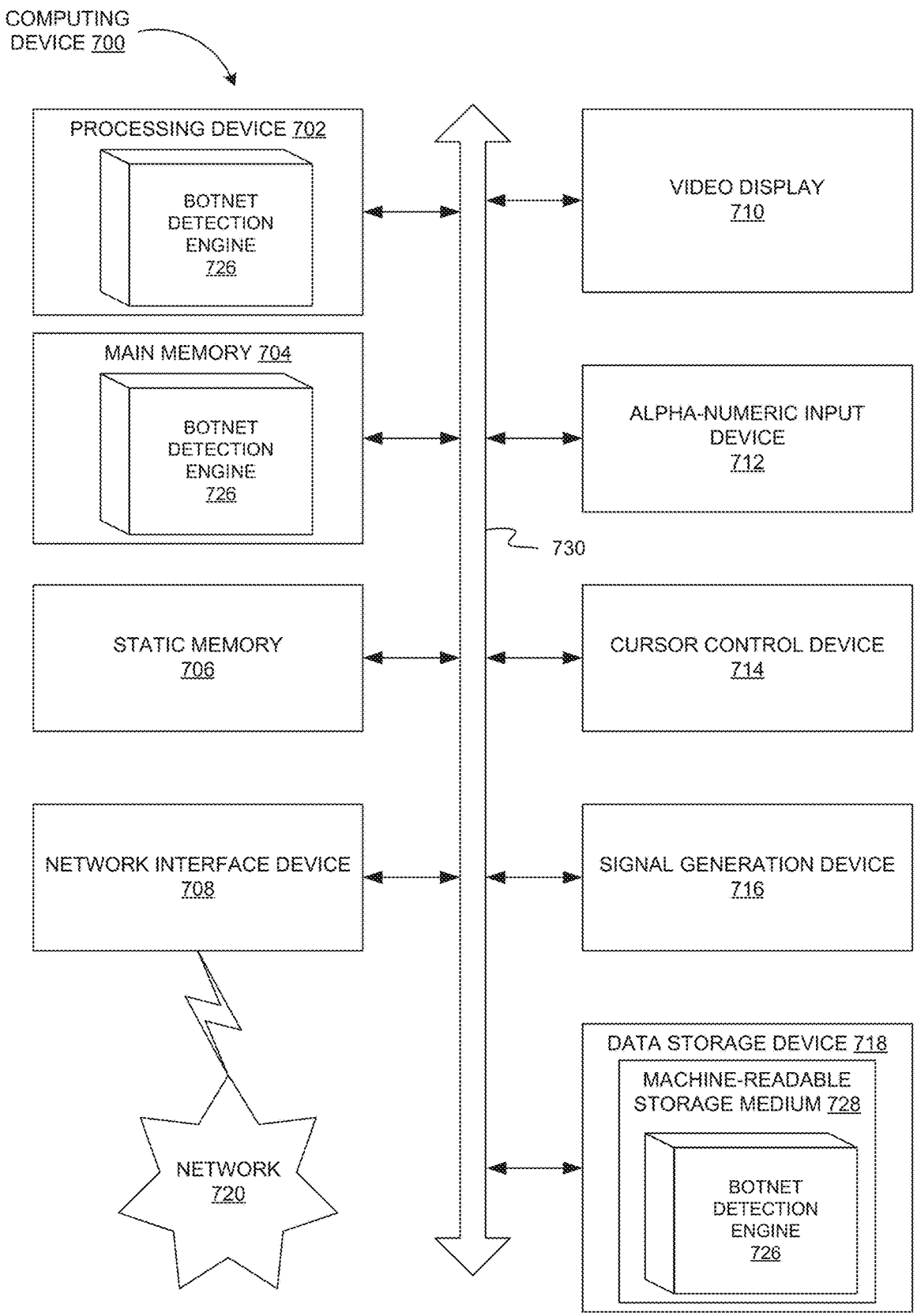
FIG. 7 is a block diagram of an example computing device that may perform one or more of the operations described herein, in accordance with some embodiments of the present disclosure.

FIG. 7 is a block diagram of an example computing device 700 that may perform one or more of the operations described herein, in accordance with some embodiments of the present disclosure. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein. In one embodiment, processing device 702 represents processing device 120 of FIG. 1A. In another embodiment, processing device 702 represents a processing device of a client device (e.g., client device 150 of FIG. 1A).

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions, e.g., instructions for carrying out the operations described herein, in accordance with one or more aspects of the present disclosure. Instructions implementing botnet detection engine 726 may also reside, completely or at least partially, within main memory 704 and/or within processing device 702 during execution thereof by computing device 700, main memory 704 and processing device 702 also constituting computer-readable media. The instructions may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms are used interchangeably herein to refer to a URI, which is a string of characters used to identify a name or a web resource.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video). Client end stations (e.g., server hardware, workstations, laptops, netbooks, palm tops, mobile phones, smartphones, multimedia phones, Voice Over Internet Protocol (VOIP) phones, user equipment (UE), terminals, portable media players, GPS units, gaming systems, set-top boxes) may execute an Hypertext Transfer Protocol (HTTP) client (e.g., a web browser) to access content and/or services provided over a Local Area Network (LAN), over the Internet, and/or over virtual private networks (VPNs) overlaid on (e.g., tunneled through) the Internet. The content and/or services are typically provided by one or more end stations (e.g., server end stations comprising server hardware) running a web application server and belonging to a service or content provider or end stations participating in a peer to peer service, and may include, for example, public web pages (e.g., free content, store fronts, search services), private web pages (e.g., username/password accessed web pages providing email services), and/or corporate networks over VPNs.

As used herein, a web application server is system software (running on top of an operating system) executed by server hardware upon which web applications run. Web application servers may include a web server (e.g. Apache, Microsoft® Internet Information Server (IIS), nginx, lighttpd), which delivers web pages on the request of HTTP clients using HTTP, and may also include an application server that executes procedures (i.e., programs, routines, scripts) of a web application. Web application servers typically include web server connectors, computer programming language libraries, runtime libraries, database connectors, and/or the administration code needed to deploy, configure, manage, and connect these components. Web applications are computer software applications made up of one or more files including computer code that run on top of web application servers and are written in a language the web application server supports. Web applications are typically designed to interact with HTTP clients by dynamically generating HTML responsive to HTTP request messages sent by those HTTP clients. Many web applications utilize databases (e.g., relational databases such as PostgreSQL, MySQL, and Oracle, and non-relational databases, also known as NoSQL databases, such as MongoDB, Riak, CouchDB, Apache Cassandra and HBase) to store information received from HTTP clients and/or information to be displayed to HTTP clients.

HTTP clients interact with web applications by transmitting HTTP request messages to web application servers, which execute portions of web applications and return web application data in the form of HTTP response messages back to the HTTP clients, where the web application data may be rendered using a web browser. Thus, HTTP functions as a request-response protocol in a client-server computing model, where the web application servers typically act as the "server" and the HTTP clients typically act as the "client."

What is claimed is:

1. A method comprising:
    identifying, from online clustering data comprising a plurality of event clusters, an internet protocol (IP) pair, wherein the IP pair comprises two source IP addresses;
    determining, during an offline process of clustering the plurality of event clusters, a distance metric corresponding to a distance between a feature of each of the two source IP addresses;
    determining, by a processing device during the offline process, that the IP pair is part of a botnet when the distance metric is less than a predefined threshold;
    in response to the determining, appending data associated with the botnet to the online clustering data to generate enhanced clustering data; and
    analyzing, using an online clustering algorithm, a new set of incidents based on the enhanced clustering data to detect events occurring over a time frame or events occurring over multiple sites, wherein the new set of incidents are analyzed to classify the new set of incidents based on at least one selected from a group comprising a number of customers involved, a type of attack, and a histogram/distribution of industries, and wherein the new set of incidents are classified as being a targeted attack or a community attack as being an industry-based attack or a spray-and-pray attack.

2. The method of claim 1, wherein in response to the determining, the method further comprising blocking one or more IP addresses associated with the botnet.

3. The method of claim 1, further comprising:
extracting the feature from the online clustering data; and
defining a distance function corresponding to the distance metric, the distance function to calculate a distance between the feature of the two source IP addresses, respectively.

4. The method of claim 3, wherein the feature comprises at least one of: an IP property, a correlation property, a narrative property, or a history property.

5. The method of claim 1, further comprising determining that the botnet is associated with a multi-site attack.

6. The method of claim 1, further comprising determining that the botnet is associated with an attack occurring over a duration that exceeds a predefined threshold.

7. The method of claim 1, further comprising determining that the botnet is associated with an attack occurring over a regular period.

8. A system, comprising:
a memory to store data associated with a botnet; and
a processing device, operatively coupled to the memory, the processing device to:
identify, from online clustering data comprising a plurality of event clusters, an internet protocol (IP) pair, wherein the IP pair comprises two source IP addresses;
determine, during an offline process of clustering the plurality of event clusters, a distance metric corresponding to a distance between a feature of each of the two source IP addresses;
determine, during the offline process, that the IP pair is part of the botnet when the distance metric is less than a predefined threshold;
in response to the determination, append the data associated with the botnet to the online clustering data to generate enhanced clustering data; and
analyze, using an online clustering algorithm, a new set of incidents based on the enhanced clustering data to detect events occurring over a time frame or events occurring over multiple sites, wherein the new set of incidents are analyzed to classify the new set of incidents based on at least one selected from a group comprising a number of customers involved, a type of attack, and a histogram/distribution of industires, and wherein the new set of incidents are classified as being a targeted attack or a community attack as being an industry-based attack or a spray-and-pray attack.

9. The system of claim 8, wherein in response to the determination, the processing device is further to block one or more IP addresses associated with the botnet.

10. The system of claim 8, the processing device further to:
extracting the feature from the online clustering data; and
defining a distance function corresponding to the distance metric, the distance function to calculate a distance between the feature of the two source IP addresses, respectively.

11. The system of claim 8, wherein the feature comprises at least one of: an IP property, a correlation property, a narrative property, or a history property.

12. The system of claim 8, the processing device further to determine that the botnet is associated with a multi-site attack.

13. The system of claim 8, the processing device further to determine that the botnet is associated with an attack occurring over a duration that exceeds a predefined threshold.

14. The system of claim 8, the processing device further to determine that the botnet is associated with an attack occurring over a regular period.

15. A non-transitory computer-readable storage medium, comprising instructions, which when executed by a processing device cause the processing device to:
identify, from online clustering data comprising a plurality of event clusters, an internet protocol (IP) pair, wherein the IP pair coprises two source IP addresses;
determining, during an offline process of clustering the plurality of event clusters, a distance metric corresponding to a distance between a feature of each of the two source IP addresses;
determine, by the processing device during an offline process, that the IP pair is part of a botnet when the distance metric is less than a predefined threshold;
in response to the determination, append data associated with the botnet to the online clustering data to generate enhanced clustering data; and
analyze, using an online clustering algorithm, a new set of incidents based on the enhanced clustering data to detect events occurring over a time frame or events occurring over multiple sites, wherein the new set of incidents are analyzed to classify the new set of incidents based on at least one selected from a group comprising a number of customers involved, a type of attack, and a histogram/distribution of industries, and wherein the new set of incidents are classified as being a targeted attack or a community attack as being an industry-based attack or a spray-and-pray attack.

16. The non-transitory computer-readable storage medium of claim 15, wherein in response to the determination, the processing device is further to block one or more IP addresses associated with the botnet.

17. The non-transitory computer-readable storage medium of claim 15, the processing device further to:
extracting the feature from the online clustering data; and
defining a distance function corresponding to the distance metric, the distance function to calculate a distance between the feature of the two source IP addresses, respectively.

* * * * *